(No Model.)

W. LINCOLN.
GRAIN SPOUT FOR THRASHING MACHINES.

No. 339,560. Patented Apr. 6, 1886.

Witnesses.
A. Ruppert
R. E. Grant

Inventor.
Ward Lincoln,
Per
Thomas P. Simpson
Atty.

UNITED STATES PATENT OFFICE.

WARD LINCOLN, OF LITTLE ROCK, ILLINOIS.

GRAIN-SPOUT FOR THRASHING-MACHINES.

SPECIFICATION forming part of Letters Patent No. 339,560, dated April 6, 1886.

Application filed January 4, 1886. Serial No. 187,523. (No model.)

*To all whom it may concern:*

Be it known that I, WARD LINCOLN, a citizen of the United States, residing at Little Rock, in the county of Kendall and State of Illinois, have invented certain new and useful Improvements in Grain-Spouts for Thrashing-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
The invention will first be described in connection with the drawings, and then pointed out in the claim.

Figure 1:
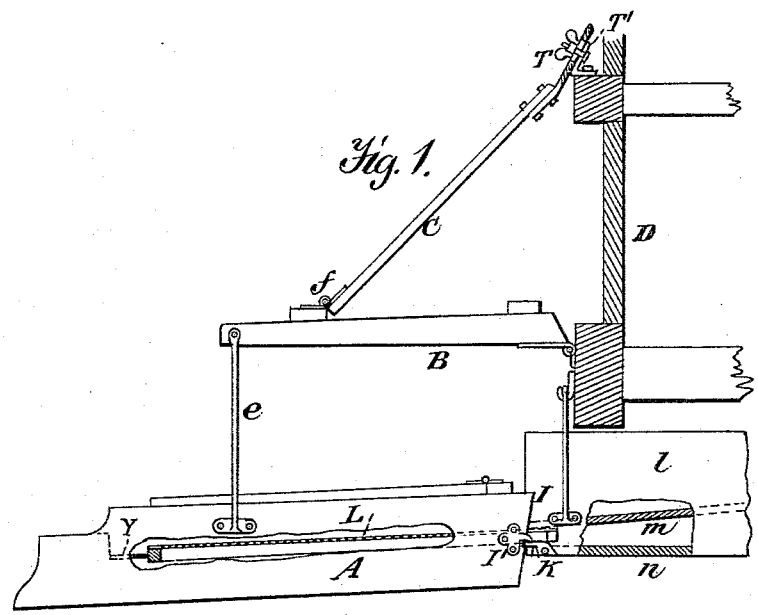
Figure 2:
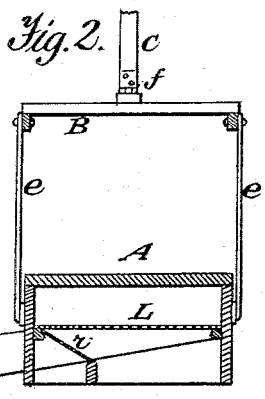
Figure 3:
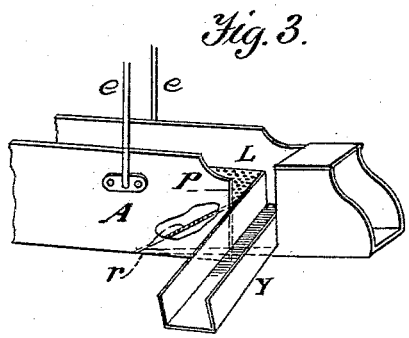

Figure 1 of the drawings is an elevation, partly broken away so as to show the sieve.
Fig. 2 is a vertical cross-section on line *x x* of Fig. 1. Fig. 3 is a detail view of the shoe in perspective.

In the drawings, A represents the shoe; B, a hinged frame connected therewith by the pivoted rods *e e*; C, a brace hinged at *f* to the forward end of the top of frame B, while its upper end is adjustably connected by slot and adjusting-screw with the castings T T', the latter made fast to the thrasher-frame D.
The shoe A has paralled sides, between which is the sieve L, made of metal, perforated to suit the size of seed which is to be cleaned; or it may be formed of wire-gauze. This screen projects over the back I, between the under side of the inclined tilt-board *m* and the bottom board, *n*, of the grain-spout *l* of the winnowing-shoe of the thrasher. This brings the screen L as nearly as possible on a line with the tilt-board, so as to prevent the grain from passing through, and cause it to screen out small bits of straw and other particles.

The operation is as follows: The grain passes from the thrasher tilt-board *m* upon and through the sieve or screen L, leaving on the latter bits of straw and large grain which, are carried by the shaking motion down the incline of the shoe into the discharge-spout *y*. This spout is so arranged as to clear the shoe as the latter vibrates.

It will be observed that the side of the shoe is cut off at P, and another plate, *v*, inserted at an angle to the parallel sides, the lower edge being extended so as to discharge the grain which falls through the sieve upon said plate as far as possible from the screenings and confine the discharge of grain to a narrower stream.

It will be observed that the shoe is hinged to frame D nearly or quite on the line of junction of the sieve or screen L and the tilting board *m*. The hook I and eye K allow a vertical movement of the shoe A, so that the latter's inclination and that of the screen may be graduated to a greater or less volume of grain or screenings.

The shoe A has the same vibration as the thrasher-spout *l*, and this is provided for by the swinging rods *e e*, which also support a great part of its weight.

Having thus described all that is necessary to a full understanding of my invention, what I claim as new, and desire to protect by Letters Patent, is—

A grain-spout for thrashing-machines, comprising the sieve-shoe A, hinged frame B, and hinged adjustable brace C, in combination with the spout of the winnower and the thrasher-frame D, substantially as and for the purpose specified.

In testimony whereof I affix my signature in presence of two witnesses.

WARD LINCOLN.

Witnesses:
ELI SMITH,
S. C. LINCOLN.